UNITED STATES PATENT OFFICE.

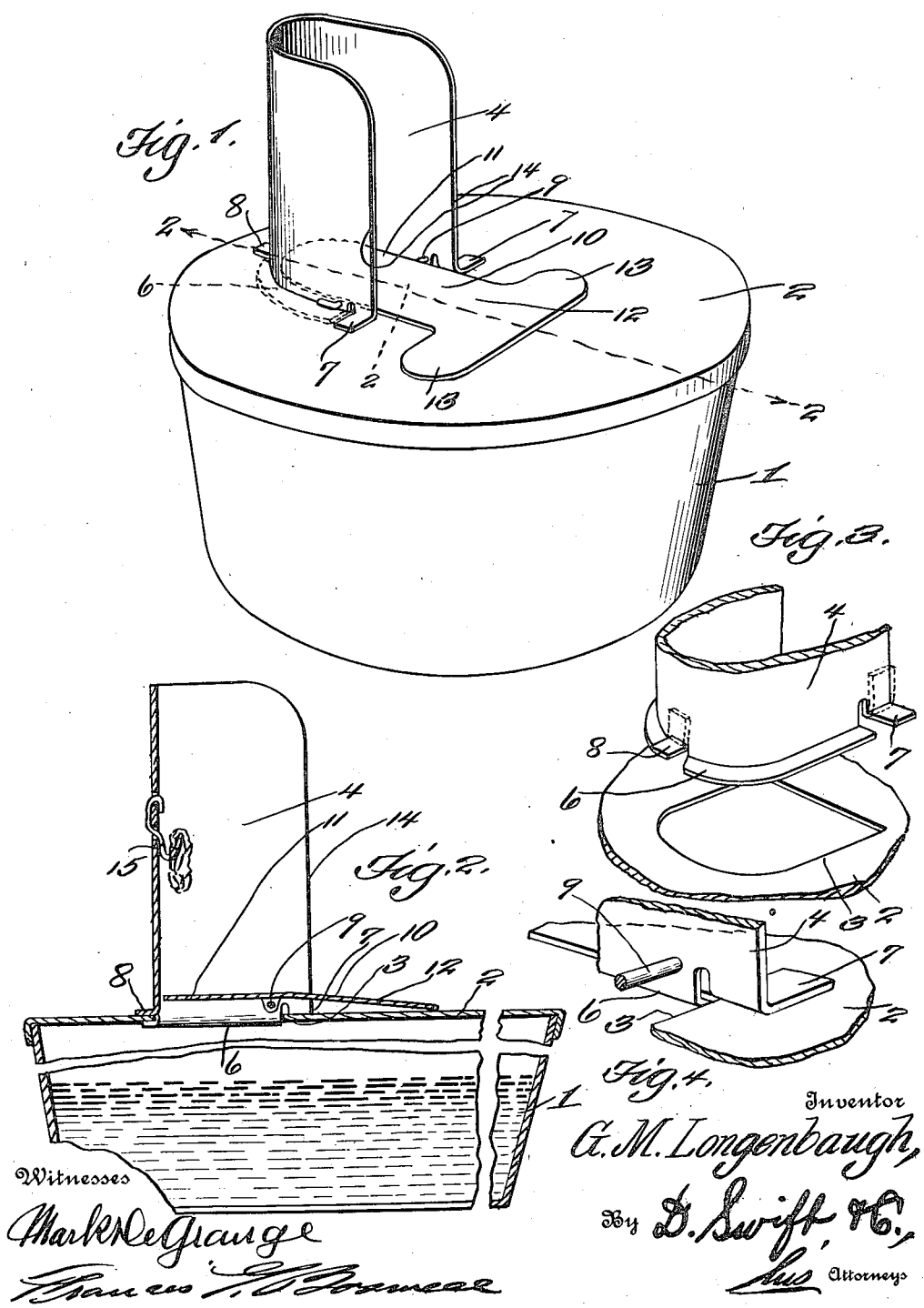

GEORGE M. LONGENBAUGH, OF CORTEZ, COLORADO.

ANIMAL-TRAP.

1,173,669.

Specification of Letters Patent. Patented Feb. 29, 1916.

Application filed May 27, 1913. Serial No. 770,239.

*To all whom it may concern:*

Be it known that I, GEORGE M. LONGENBAUGH, a citizen of the United States, residing at Cortez, in the county of Montezuma and State of Colorado, have invented a new and useful Animal-Trap; and I do hereby declare the following to be a full, clear, and exact description of the invention, such as will enable others skilled in the art to which it appertains to make and use the same.

This invention relates to a new and useful trap, particularly adapted for catching mice and the like.

An object of the invention is to provide a trap of such a structure that when the trap is sprung or actuated, the mice will fall in water or the like and drown, or be securely held in a wire cage or other suitable receptacle.

A feature of the invention is to construct a large area of sheet metal with a D-shaped opening having a tilting trap member pivoted in such wise, that one end of the same will move or operate through the opening, another feature is the provision of a hood surrounding said opening, and in which hood the bait is hung or suspended.

Another feature of the invention is the provision of novel means for securing the hood detachably in position.

Another feature is to provide the trap member with a weighted end to cause the trap member to instantly return to its normal position after being sprung, said weighted ends constituting lugs to contact with the forward edges of the hood, to not only limit the trap or tilting member, but to assist in causing the same to rebound to its normal position.

Another and important object of the invention is to provide a simple, efficient and practical trap hood, which is constructed of suitable sheet metal, D-shaped in plan view, to be inserted upwardly through a correspondingly shaped opening of the top of any trap receptacle, and having flanges and lugs at its lower edge, to engage the upper and under surfaces of the top of the receptacle to hold the same in position. It is the design of this invention, that the hood be manufactured as above disclosed with a tilting trapping member adapted to be pivoted therein, but when shipped the hood and the trapping member are disassembled and nested. The purchaser, however, whether a first-class mechanic or not, may readily cut an opening corresponding in shape to the hood in the top of any suitable receptacle, in order that the hood may be securely connected as shown and described.

In practical fields the details of construction may necessitate alterations, to which the patentee is entitled, provided the alterations fall within the scope of what is claimed.

In the drawings:—Figure 1 is a view in perspective of the improved trap constructed in accordance with the invention. Fig. 2 is a sectional view on line 2—2 of Fig. 1. Fig. 3 is a detail view showing a portion of the hood disclosing the manner in which the same is detachably connected to the area of sheet metal forming the cover to the receptacle in which the water is arranged, or into a wire cage or other receptacle. Fig. 4 is an enlarged detail view.

Referring more particularly to the drawings, 1 designates a receptacle, in which water or the like is arranged for drowning the mice or other animals. Arranged on the receptacle is a cover or closure constructed of sheet metal. This cover or closure 2 is provided with a D-shaped opening 3, and secured detachably in this opening is a D-shaped guard or hood 4. To secure the guard or hood detachably in the opening, the hood is provided with an annular flange 6, which is arranged adjacent the under surface of the cover or closure. Projecting laterally from each side of the hood and from the curved portion thereof are lugs 7 and 8, which are disposed above and adjacent the upper surface of the closure or cover, so as to securely but detachably connect the hood in place. In order to disconnect the hood or guard, the lugs 7 may be bent as shown in dotted lines in Fig. 3, and after first having removed the pivot rod 9 of the tilting trap member 10, the hood or guard may be pushed through the D-shaped opening. The end 11 of the tilting trap member moves through the D-shaped opening, that is, when a mouse passes the point of the pivot rod. The end 12 of the tilting trap member is provided with laterally extending lugs 13, which are designed to contact with the edges 14 of the guard or hood, in order to limit the member 10 in its tilting movement, and also cause the member to rebound to its normal position. The lugs not only act as stocks for the member 10, but also constitute weights to assist in returning the member 10 to its normal position.

In trapping a mouse or other animal the bait is hung or suspended upon a hook 15 of the hood or guard, or other convenient device, so as to attract the attention of the mouse. He then walks upon the member 10, and while in the act of reaching for the bait, the mouse having passed the pivot rod, will tilt the member 10 and fall in the water or other fluid, where the animal is drowned, or securely held and confined in a wire cage, or other receptacle.

The pivot ears on the tilting or trapping member 10 act to hold the opposite sides of the trap hood spread apart, so as to insure secure and proper connection of said lugs and flanges at the forward and rear portions of the sides of said D-shaped opening.

The invention having been set forth, what is claimed as new and useful is:—

1. A D-shaped trap hood, a pivot member mounted in the sides thereof, an oscillatory trapping element provided with side ears pivotally mounted on the pivot member, one end of the trapping member corresponding to and fitting the hood, said hood having lateral flanges at its lower edge engaging under the top of a trap receptacle, said hood being insertible upwardly through the correspondingly shaped opening of the top of the trap receptacle and having lugs engaging upon the top surface of the top, the ears acting to hold the sides of the hood spread apart to hold the hood in its opening.

2. In combination, a trap hood insertible upwardly through the correspondingly shaped opening in the top of a trap receptacle, and provided at its lower edge with flanges and lugs engageable below and above the top of the receptacle, and a trapping element pivoted in the hood and having pivot ears to spread the sides of the hood against the opposite sides of the opening in the top.

3. In combination, a trap receptacle having a D-shaped opening in its top, a D-shaped trap hood insertible upwardly through said opening and having flanges and lugs engaging upper and lower surfaces of the top of the receptacle, and a trapping element pivoted in said hood and having pivot ears to spread the sides of the hood against the opposite sides of said opening.

In testimony whereof I have signed my name to this specification in the presence of two subscribing witnesses.

GEORGE M. LONGENBAUGH.

Witnesses:
R. S. FAIRCHILD,
W. HOFIELD.